United States Patent [19]
Whatley

[11] Patent Number: 5,632,940
[45] Date of Patent: May 27, 1997

[54] METHOD OF MAKING AN INTEGRALLY STIFFENED ARTICLE

[76] Inventor: Bradford L. Whatley, 161 Ward Ct., Lakewood, Colo. 80228

[21] Appl. No.: 219,647

[22] Filed: Mar. 29, 1994

[51] Int. Cl.⁶ .................................................. B29C 70/44
[52] U.S. Cl. ................... 264/46.4; 156/173; 156/175; 156/182; 156/189; 156/190; 156/191; 156/192; 156/193; 156/245; 264/510; 264/571; 264/157; 264/257; 264/258; 264/46.7
[58] Field of Search ........................... 156/190, 191, 156/192, 193, 189, 285, 182, 173, 175, 245; 264/157, 257, 258, 510, 571, 46.4, 46.7

[56] References Cited

U.S. PATENT DOCUMENTS

| | | | |
|---|---|---|---|
| 3,978,256 | 8/1976 | James | 156/192 |
| 4,512,835 | 4/1985 | Gardiner | 156/182 |
| 5,112,422 | 5/1992 | Takahashi | 156/182 |
| 5,348,601 | 9/1994 | Ray | 264/258 |
| 5,435,869 | 7/1995 | Christensen | 156/173 |
| 5,474,632 | 12/1995 | Ray et al. | 156/175 |

*Primary Examiner*—Mathieu D. Vargot
*Attorney, Agent, or Firm*—John E. Reilly

[57] ABSTRACT

A method of making an article from a fiber reinforced polymer composite material including the steps of providing at least two mandrels, wrapping at least one of the mandrels with a first layer of a fiber reinforced polymer composite material, disposing the at least two mandrels in a predetermined orientation, wrapping a second layer of a fiber reinforced polymer composite material around the mandrels, and curing the wrapped assembly.

30 Claims, 8 Drawing Sheets

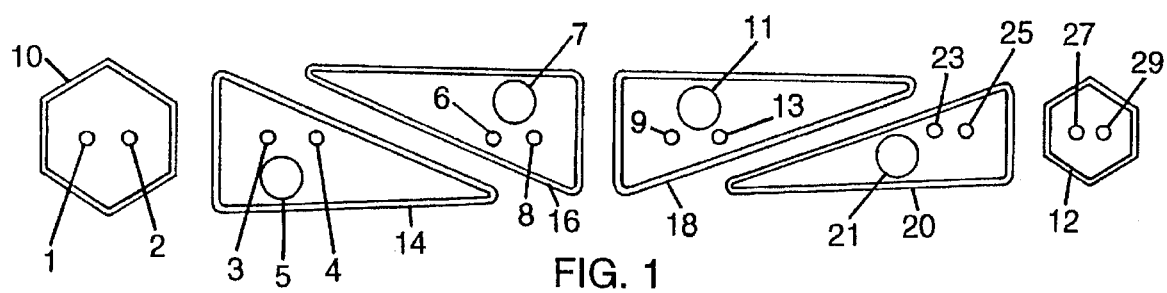
FIG. 1
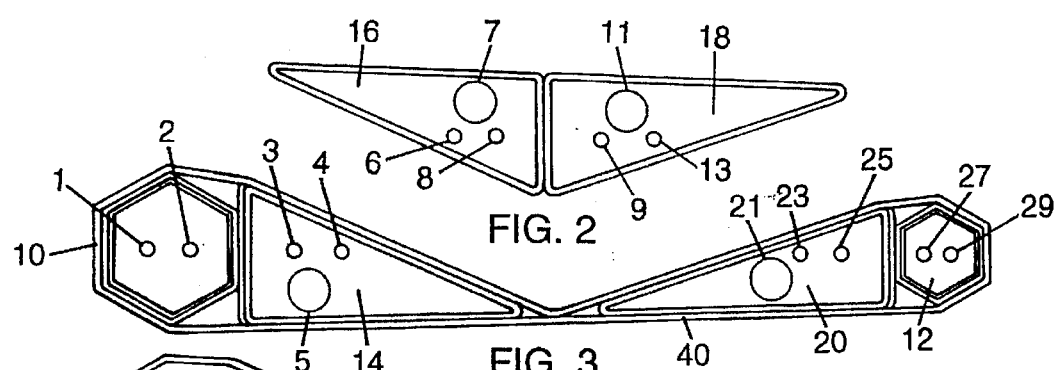
FIG. 2
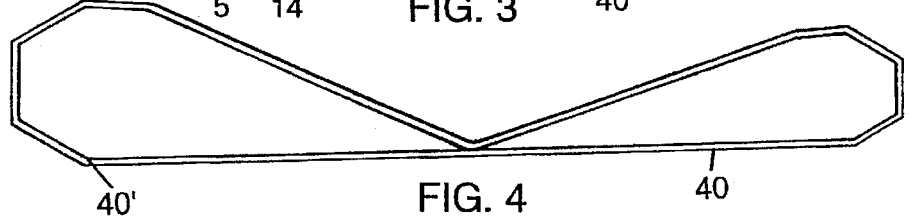
FIG. 3
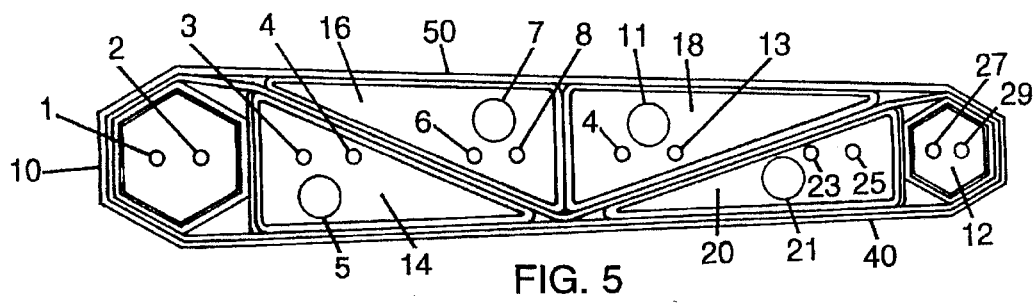
FIG. 4
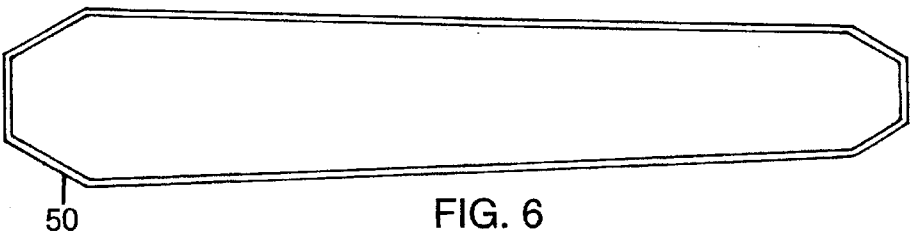
FIG. 5
FIG. 6

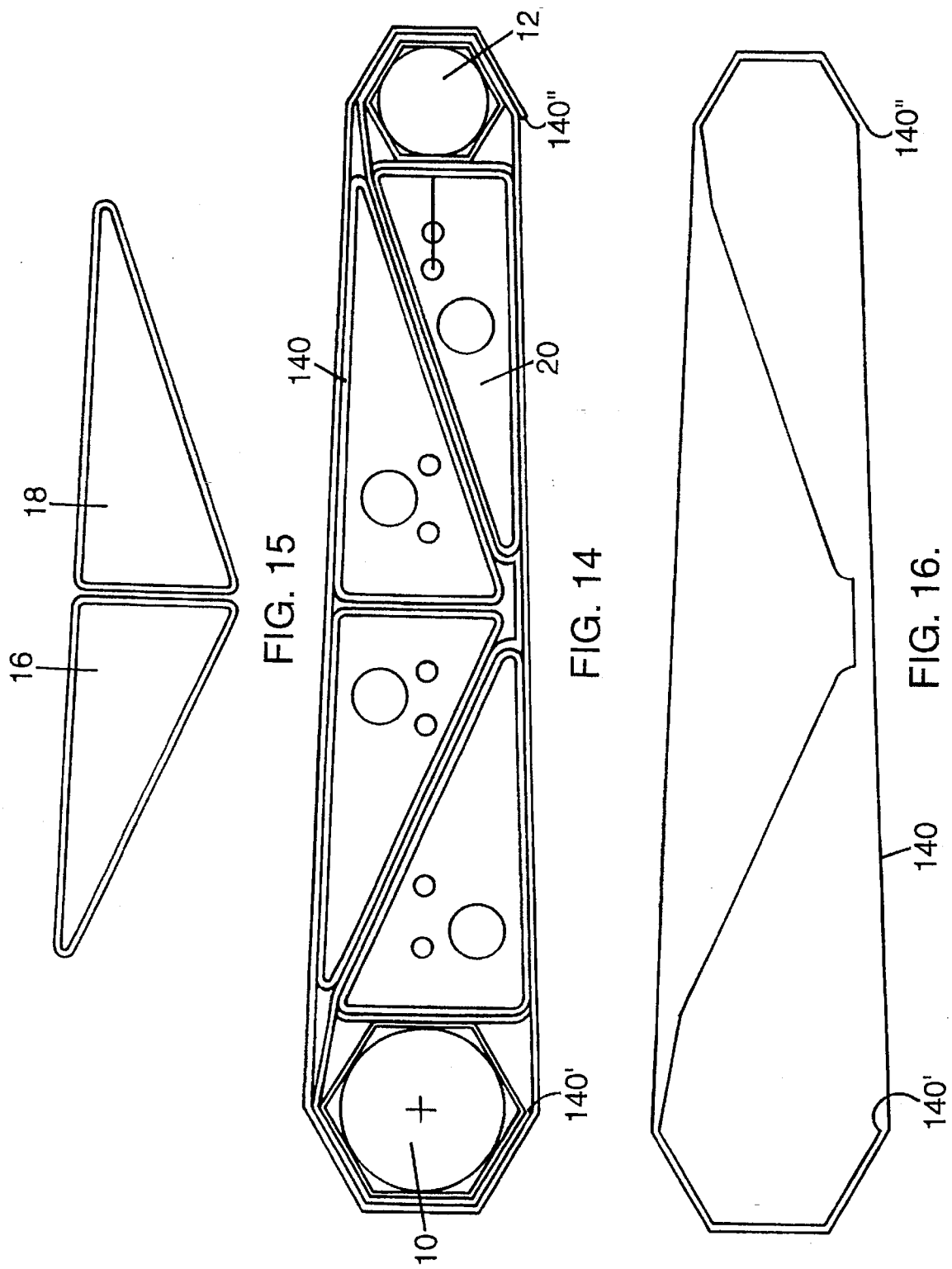

METHOD OF MAKING AN INTEGRALLY STIFFENED ARTICLE

BACKGROUND AND FIELD OF THE INVENTION

The present invention relates to fiber reinforced polymer composite materials, and more particularly pertains to an integrally stiffened article formed from a fiber reinforced polymer composite material and a method of making the article.

Advanced composite structures which require high strength to weight ratios by means of stiffeners, spars, struts and trusses are produced by manufacturing individual sub-components which are then bonded together to form the macro-stiffened structure.

While each of the sub-components can be produced with optimal characteristics, the overall structure will only be as strong as the bonding between the various sub-components.

In accordance with the present invention, a technology has been devised in which the sub-component stiffeners, spars, trusses and struts share common fibers which join the various elements into a macro-structure which does not rely on bond strength of materials to integrate the stiffeners together into a macro structure.

As applied to a crank arm for bicycles, current materials of choice are aluminum or steel. While aluminum is light weight compared to steel, it does not have the modulus of steel and, as the crank is loaded, it flexes and energy is lost into the crank flex and not transmitted into the drive train. Steel has greater modulus than aluminum and transmits more energy into the drive train. Because steel is a heavier material than aluminum, more energy is expended by having to move the additional weight of the steel crank arm.

The integrally stiffened crank arm of the present invention is lighter weight than aluminum and steel, yet has stiffness and modulus greater than aluminum, approaching steel. This means the energy transference from the rider to the drive train of the bike through the crank arm is superior to aluminum because it doesn't flex as much as aluminum when it is loaded and is superior to steel because less energy is expended to move the crank arm due to its lighter weight.

SUMMARY OF THE INVENTION

The present invention discloses a method of making an article from a fiber reinforced polymer composite material including the steps of providing at least two mandrels, wrapping at least one of the mandrels with a first layer of a fiber reinforced polymer composite material, disposing the at least two mandrels in a predetermined orientation, wrapping a second layer of a fiber reinforced polymer composite material around the mandrels, and curing the wrapped assembly.

According to another aspect of the invention, at least one of the mandrels is withdrawn after curing to form the finished article. A plurality of articles may be produced from a single cured assembly by slicing at predetermined locations.

In another aspect of the invention, each of the wrapped layers includes a plurality of plies of fiber reinforced composite material, with each ply including reinforcing fibers oriented at various predetermined angular orientations with respect to a longitudinal axis of the part.

In still another aspect of the invention, at least one of the mandrels is left in place after curing to form a permanent part of the finished article.

In a further aspect of the invention, at least one of the mandrels is removed after curing and the resulting void is filled with a foam material. Preferably, after filling the void with foam, the assembly is sliced to form individual parts of predetermined thicknesses. Then, each individual part is provided with a torsional overwrap in a lateral direction prior to a final cure.

In a particularly preferred embodiment of the invention, a bicycle crank arm is formed utilizing four elongated triangular mandrels and two hexagonal elongated mandrels. Each of the mandrels are initially individually wrapped with a multi-ply layer of fiber reinforced polymer composite material. Two of the triangular mandrels are then oriented between the hexagonal mandrels to form a subassembly which is then peripherally overwrapped with a multi-ply layer of fiber reinforced polymer composite material. The remaining two mandrels are nested in abutting relation within the subassembly, which is then again overwrapped with another multi-ply layer of fiber reinforced polymer composite material. After curing of the final assembly under vacuum conditions in an autoclave, the triangular mandrels are removed and the cured assembly is transversely sliced to form a plurality of individual crank arms. Preferably, prior to slicing, the voids formed by removal of the mandrels are filled with a foam material which is then allowed to harden. A torsional overwrap formed by multiple plies of a fiber reinforced polymer composite materials are then wrapped laterally around the individual crank arms, after the initial slicing. The individual crank arms are subsequently again cured in an autoclave to form the finished parts. The hexagonal mandrels, after slicing, form permanent parts disposed at opposite ends of the finished crank arm to facilitate attachment of the crank arm to a chain ring spider and a pedal axle.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is an end view of a set of mandrels for use in making a bicycle crank arm according to the method of the present invention.

FIG. 2 is an end view illustrating a subassembly of wrapped and overwrapped mandrels in an intermediate step in making a bicycle crank arm according to the method of the present invention.

FIG. 3 is an end view illustrating the shape of the overwrap layer of fiber reinforced polymer composite material applied to the subassembly of FIG. 2.

FIG. 4 is an end view illustrating the orientation of two mandrels in abutting relation prior to disposition in nested relation within the subassembly of FIG. 2.

FIG. 5 is an end view illustrating the completed mandrel assembly after application of a second overwrap layer of fiber reinforced polymer composite material.

FIG. 6 is an end view illustrating the shape of the second overwrap layer of fiber reinforced polymer composite material applied to the subassembly of FIG. 6.

FIG. 14 is an end view of a modified form of wrapping procedure in place of that shown in FIG. 3.

FIG. 15 is an end view of the orientation of two mandrels in abutting relation prior to disposition in nested relation prior to completion of the wrapping procedure of the modified form; and FIG. 16 is a somewhat diagrammatic view of the wrapping procedure of the modified form of invention.

DETAILED DESCRIPTION OF THE PREFERRED EMBODIMENT(S)

Figure 7:
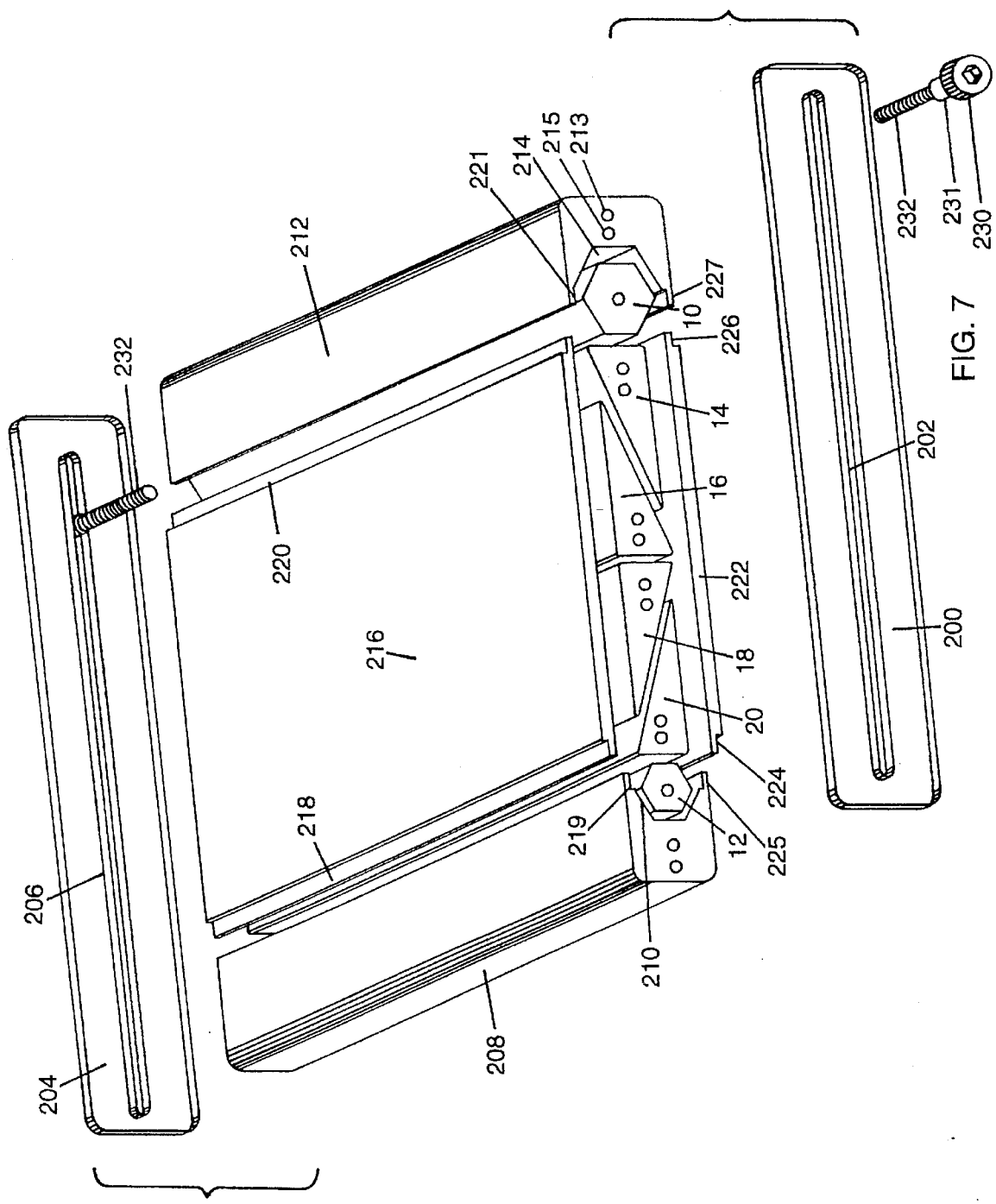
FIG. 7 is a perspective view illustrating the completed mandrel assembly and an associated jig fixture prior to curing and removal of the triangular mandrels.

Referring now to the drawings, wherein like reference numerals designate corresponding structure throughout the views, and referring in particular to FIG. 1, the method of making an integrally stiffened article using a fiber reinforced polymer composite material according to the present invention will be described with respect to the use of a bicycle crank arm as an exemplary article. It should be noted that the method of the instant invention may also be employed in connection with the manufacture of a wide variety of other articles such as robotics arms, prosthetic devices, motion linkage systems, and components and frames for automobiles, trucks, bicycles, motorcycles, and aircraft, as well as in a wide variety of structural applications such as bridges, building frames, etc.

Within the context of the present disclosure, the term "fiber reinforced polymer composite material" refers to composite materials including reinforcement fibers such as carbon fiber, KEVLAR, fiberglass, etc., held together by a matrix material of thermoset or thermoplastic polymers such as epoxy, polyester or nylon.

A preferred method of manufacture of a bicycle crank arm according to the present invention employs a set of six elongated solid aluminum mandrels 10, 12, 14, 16, 18, 20, four of which possess substantially identical right triangular transverse cross-sectional shapes 14, 16, 18, and 20, and the remaining two of which have hexagonal transverse cross-sectional shapes 10, 12. It should be noted that FIG. 1 illustrates an end view of the mandrels, which may be formed with a wide variety of different lengths depending upon the desired thickness of the resulting part and the number of parts to be sliced from each resulting assembly after curing and mandrel removal. The mandrels are each preferably formed from a 6061 aluminum alloy material which will expand slightly during curing, although a wide variety of other strong, rigid materials may be employed.

In the method of the invention, the mandrels 10, 12, 14, 16, 18, and 20 are each initially cleaned with MEK and sealed using a conventional mold sealing compound. Thereafter, the removable temporary triangular mandrels 14, 16, 18, and 20 are coated with a mold release agent, such as, Frekote 44-MC made and sold by Dexter Corporation of Seabrook, N.H. Hexagonal mandrels 10 and 12 form a permanent part of the finished bicycle crank arm, as described hereinafter, and need not be coated with the mold release agent.

The permanent hexagonal mandrels 10 and 12 are instead first cleaned, and then wrapped with a fiberglass scrim to prevent a galvanic reaction with the subsequently applied reinforced polymer composite material.

Prior to application, the selected reinforced polymer composite material is cut into plies of desired fiber orientations and lengths. A preferred reinforced polymer composite material for use in making a bicycle crank arm according to the method of the present invention is a single-ply preimpregnated carbon/epoxy unidirectional tape available from ICI Fiberite of Tempe, Ariz.

Figure 12:
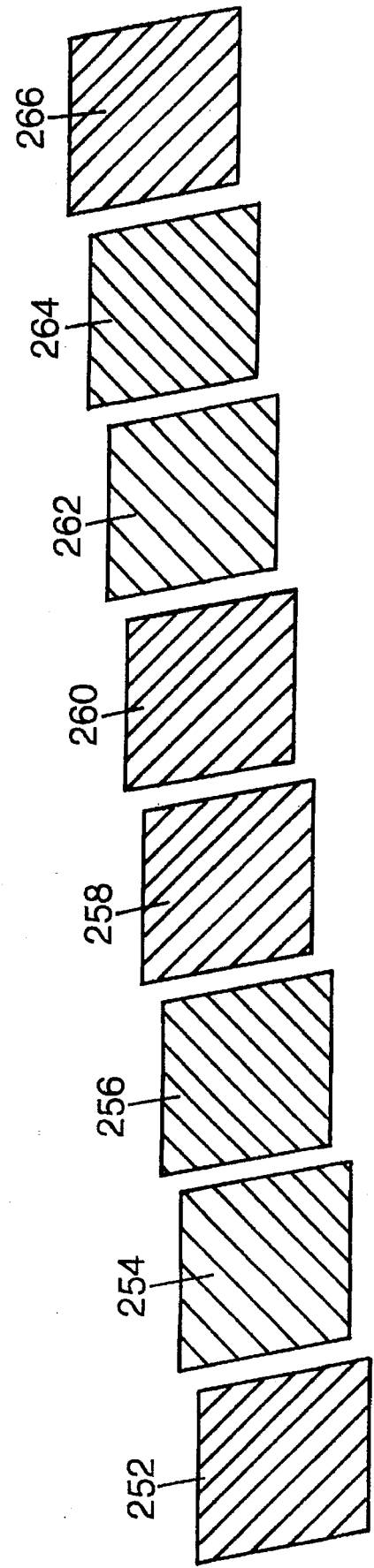
FIG. 12 is a further representative diagrammatic view illustrating a multi-ply wrapping in which all plies have a zero degree fiber orientation with respect to the direction of wrapping.
Figure 13:
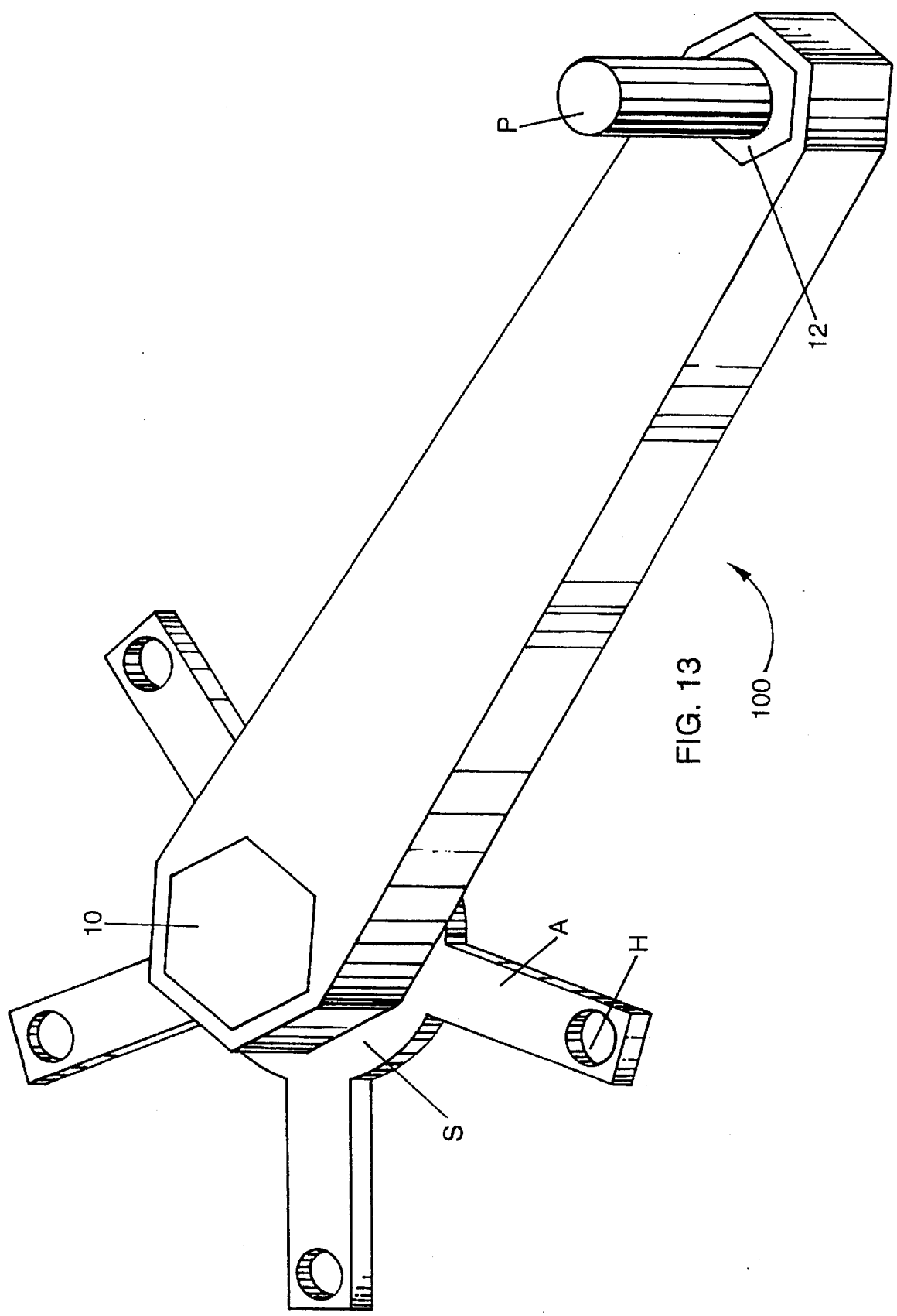
FIG. 13 is a perspective view illustrating a finished crank arm made according to the method of the present invention secured to a conventional bicycle chain ring spider and pedal axle.

Each of the mandrels 10, 12, 14, 16, 18, and 20 is then individually wrapped with seven plies 270, 272, 274, 276, 278, 280 and 282 as shown in FIG. 12, composed of the reinforced polymer composite material; and preferred successive fiber orientations with respect to the longitudinal axis of the finished bicycle crank arm are wrapped at 0° as shown to the direction of extension. The combined thickness of the seven plies on the mandrels falling in the inclusive range of 0.04 through 0.05 inches. For purposes of wrapping the reinforced polymer composite material tape on the mandrels and subsequently around the subassembly and assembly described hereinafter, a roller pin system is preferably employed to achieve good compaction and tight wraps on or around the mandrels. The roller pin assembly generally comprises two conventional rolling pins having parallel shafts extending through aligned apertures formed through handle portions of each of the rolling pins. Springs and washers disposed on the shafts bias the cylindrical operative surfaces of the rolling pins together, thus providing a biasing force serving to tightly compress the fiber reinforced polymer composite sheet material to the associated mandrel. As an alternative to such a hand wrapping system, automated mandrel wrapping systems in conjunction with automated web handling machinery may also be employed. As an alternative to the use of sheet material, it is also contemplated that the mandrels may be wrapped using a conventional filament and winding process.

The reinforced fiber composite sheet material is preferably of the type having a peel-off adhesive backing which may be heated in an oven or with an iron prior to application. The peel-off backing is then removed such that the heated sheet material then possesses sufficient tack to adhere to itself or to the mandrel. To assist in securing the first layer of the sheet material to the mandrel, a suitable spray adhesive such as 3-M 90 might also be employed.

With reference to FIG. 2, after each of the mandrels have been individually wrapped, the mandrels 10, 12, 14, and 20 are disposed in the orientation illustrated in FIG. 2 to form a subassembly. An additional seven ply's layer 40 of the fiber reinforced polymer composite material is then wrapped around the subassembly illustrated in FIG. 2 to result in the shape generally illustrated in FIG. 3. In this wrapping step, it is contemplated that each ply of the seven ply overwrap layer 40 may be individually depressed and closely conformed to the mandrels, prior to application of each subsequent ply. To facilitate close conformance of each ply of the overwrap layer 40, the abutting mandrels 16 and 18 can be placed into position into the upwardly opening V-shaped region of the subassembly.

After completion of the overwrap layer 40, the prewrapped triangular mandrels 16 and 18 are disposed in abutting relation, as illustrated in FIG. 4, and subsequently nested within the completed overwrap subassembly illustrated in FIG. 2. The resulting configuration of all six assembled mandrels is illustrated in FIG. 5. At this juncture, an additional overwrap layer 50 having the general configuration shown in FIG. 6 is applied. As with the layers individually wrapped on the mandrels, and the overwrap layer 40, the overwrap layer 50 preferably comprises seven plies having respective fiber orientations as described above.

With reference to FIG. 7, after completion of the final overwrap layer 50, the mandrels are disposed in a jig assembly comprising end jig plates 200 and 204, side caul plates 208 and 212, and top and bottom caul plates 216 and 222, respectively. The jig fixture provides a free floating arrangement which allows the side caul plates 208 and 212 to move towards one another, while also permitting the top and bottom caul plates 216 and 222 to likewise move towards one another. This free floating configuration is achieved by the provision of longitudinal slots 202 and 206 in end jig plates 200 and 204, respectively. As shown in FIGS. 1, 2, 4, and 5, a plurality of aligned threaded apertures are provided in each of the mandrels 10, 12, 14, 16, 18, and 20, such that, after assembly, the threaded apertures are generally disposed in spaced parallel relationship. Specifically, hexagonal mandrel 10 includes a pair of threaded apertures 1 and 2, triangular mandrel 14 includes a pair of threaded apertures 3 and 4, triangular mandrel 16 includes a pair of threaded apertures 6 and 8, and triangular mandrel 18 includes a pair of threaded apertures 9 and 13. Triangular mandrel 20 includes a pair of threaded apertures 23 and 25, and hexagonal mandrel 12 includes a pair of threaded apertures 27 and 29. Additionally, the removable triangular mandrels 14, 16, 18, and 20 include respective threaded extractor apertures 5, 7, 11, and 21 respectively, to facilitate their removal from the finished part after curing.

Referring again to FIG. 7, a plurality of screws 230 each include an enlarged head and an intermediate smooth journal bearing portion 231 adapted for sliding movement along the slots 202 and 206 of the end jig plates 200 and 204. Each of the screws 230 terminates in a threaded distal end portion 232 adapted for threaded engagement with the threaded apertures in each of the mandrels. Engagement of the plurality of screws 230 with the mandrels allows movement of the mandrels in a generally horizontal direction along the length of the slots 202 and 206, while constraining them against vertical movement in a direction transverse to the slots 202 and 206. It should be readily understood that threaded apertures are formed in each end of each of the mandrels.

In order to facilitate movement of the top caul plate 216 and the bottom caul plate 222 towards the assembled mandrels, upwardly opening grooves 218 and 220 extend along side edges of the top caul plate 216, and cooperate, respectively with downwardly opening grooves 219 and 221 extending along upper edges of side caul plates 208 and 212. In a similar manner, downwardly opening grooves 224 and 226 extend along opposite longitudinal side edges of the bottom caul plate 222 and cooperate with upwardly opening grooves 225 and 227 extending along the bottom side edge portions of the side caul plates 208 and 212. By this arrangement, the caul plate 216 is restrained against upward movement, but is permitted to freely move in a downward direction toward the wrapped mandrel assembly. Similarly, the bottom caul plate 222 is constrained against movement in a downward direction, but may move in an upward direction toward the wrapped mandrel assembly. The top and bottom caul plates 216 and 222 each generally comprise a flat aluminum or steel plate, with the exception of the provision of the heretofore described grooves. The side caul plates 208 and 212 each generally comprise rectangular blocks of steel or aluminum material in which grooves 210 and 214 have been milled to conform to the hexagonal mandrels 12 and 10, respectively. Threaded apertures 213 and 215 provided in the side caul plates receive screws 230 to secure the completed jig fixture together.

Once the jig fixture has been assembled as described, the assembled jig fixture and wrapped mandrel assembly are placed in a bagging assembly and inserted and sealed within a conventional autoclave. The vacuum bag is connected by a flexible vacuum line to an external vacuum pump. In a conventional manner, the autoclave provides increased atmospheric pressure and heat to the bagged part. Preferably, the autoclave provides a pressure of 80 PSI and a temperature of 260° F. After curing under these temperature and pressure conditions for a period of about 90 minutes, the autoclave is cooled and the part thereafter removed.

Figure 8:
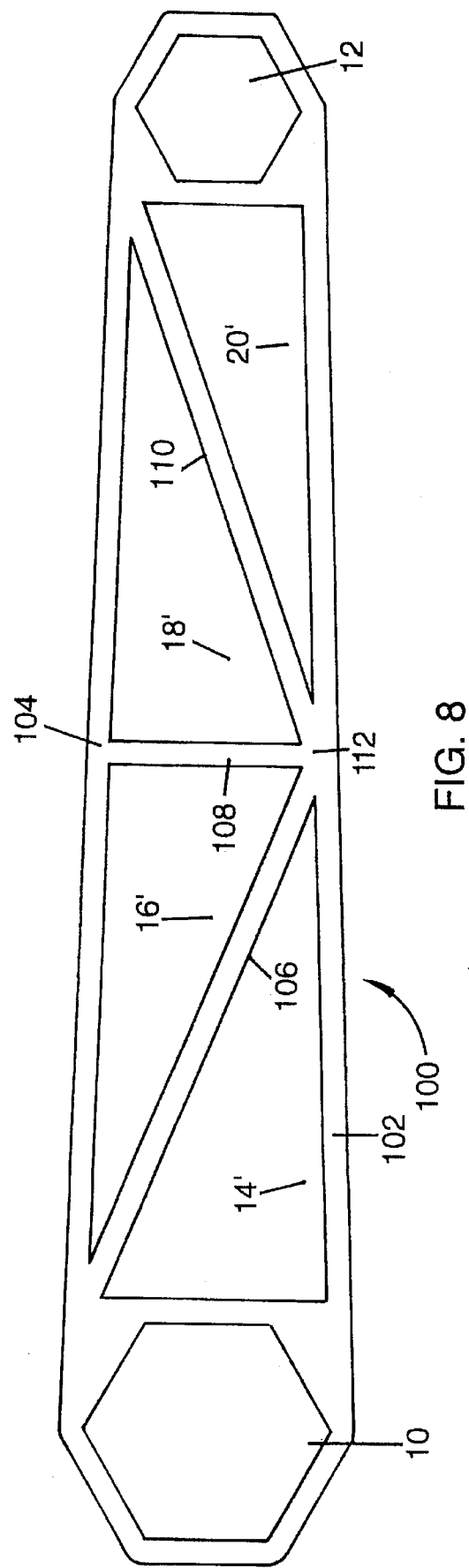
FIG. 8 is a side elevational view illustrating a cured assembly after triangular mandrel removal and prior to slicing individual components therefrom.

Upon removal from the autoclave, the jig fixture is disassembled and the completed cured component is removed from the various bagging materials. The triangular mandrels 14, 16, 18, and 20 are removed by engaging an extractor press rod with perspective threaded apertures 5, 7, 11, and 21, depicted in FIG. 1. Removal of the triangular mandrels results in an integral truss structure 100 illustrated in FIG. 8. A plurality of triangular voids 14', 16', 18', and 20' extend along the length of the part. The solid aluminum hexagonal mandrels 10 and 20 remain in position, and form a finished part of the assembly. The resulting structure includes a plurality of truss members 102, 104, 106, 108, and 110, with truss members 102, 106, 108, and 110 intersecting in a common region 112. With reference to FIG. 3 illustrating the configuration of overwrap layer 40, it can be readily appreciated that truss members 106 and 110 include a common multi-ply layer, with contiguous fiber orientation. Accordingly, the common ply fiber orientation extending without interruption along truss sections 106 and 110 results in an extremely rigid construction. Similarly, truss members 102 and 104 each likewise comprise uninterrupted continuous fiber sections.

Figure 9:
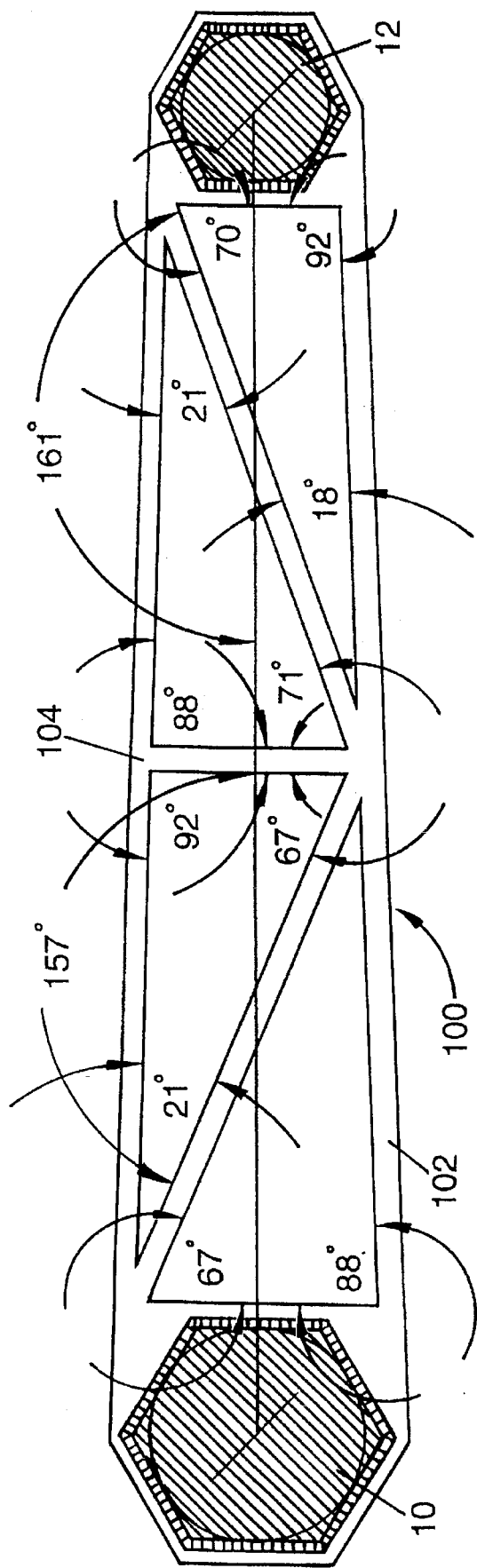
FIG. 9 is a side elevational view similar to FIG. 8, illustrating the angular dimensions of the truss members of the integrally stiffened component.

FIG. 9 illustrates preferred angular orientations for the various truss portions. It should be understood that a wide variety of different angular configurations may be selected, depending upon the intended application of the resulting part.

Figure 10:
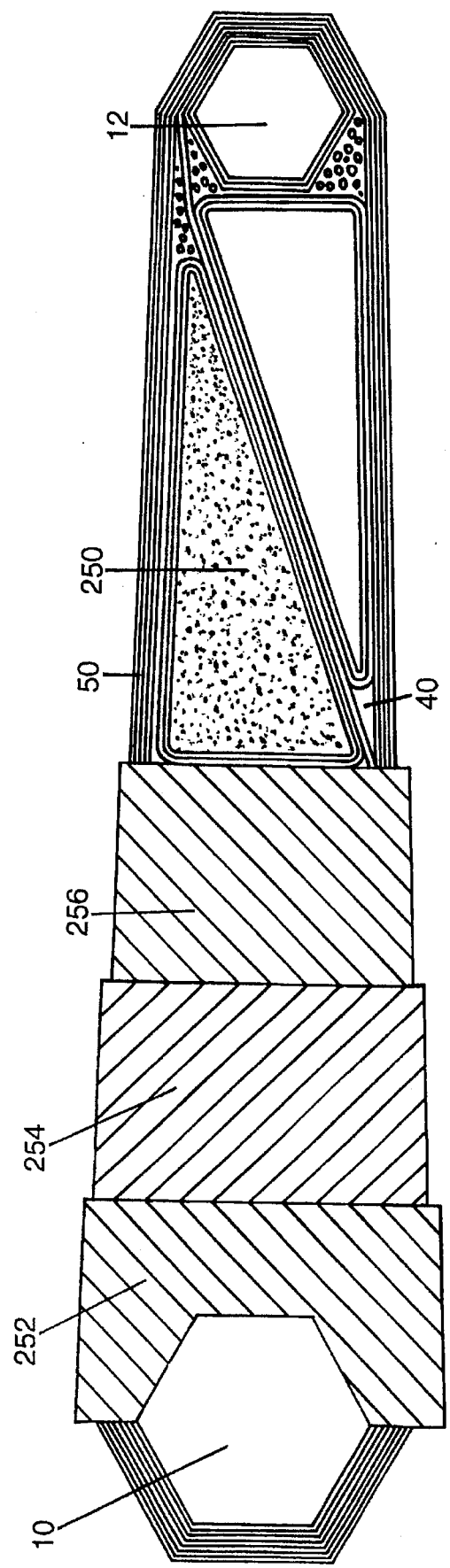
FIG. 10 is a diagrammatic side elevational view illustrating the manner of applying a multi-ply torsional overwrap to a sliced individual component subsequent to filling truss voids with a foam material.
Figure 11:
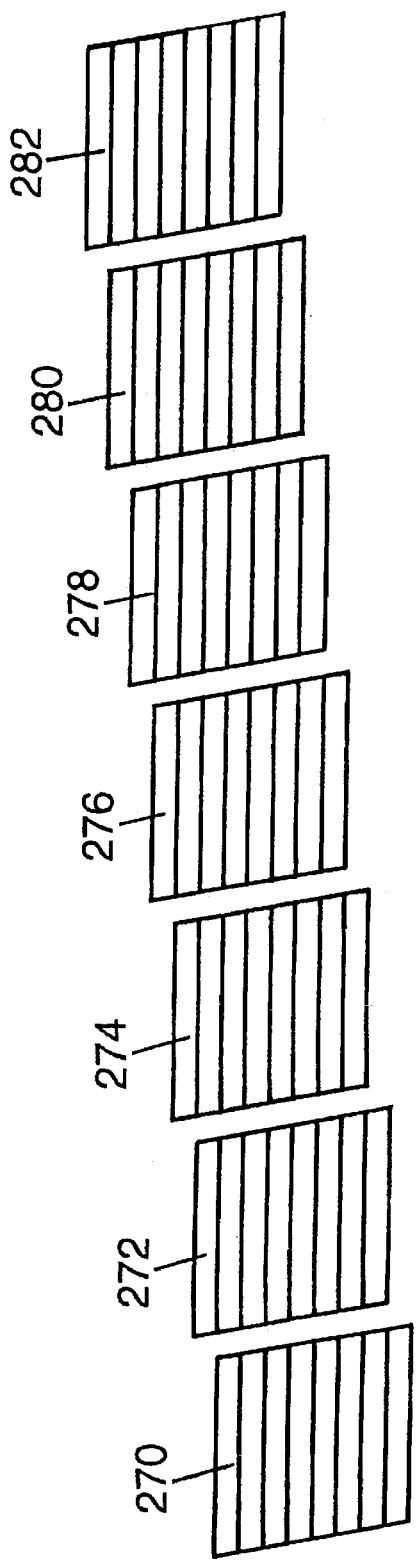
FIG. 11 is a diagrammatic view representing a 45° fiber orientation for a multi-ply wrapping application.

After removal of the triangular mandrels, a foam material 250, such as polyurethane is blown within the resulting voids 14', 16', 18', and 20' and allowed to set. The integral subassembly 100, with the triangular voids filled with a foam material, is then sliced as indicated in FIG. 10 at predetermined increments to form individual bicycle crank arm components. As shown in FIG. 10, a multi-ply torsional overwrap layer is then wrapped around each of the individual crank arm components. Preferably, the torsional overwrap layer comprises a plurality of individual plies having predetermined fiber orientations of ±45°. While only three of the plies 252, 254, and 256 are illustrated in FIG. 10, FIG. 11 illustrates the orientation of seven plies 252, 254, 256, 258, 260, 262, 264 and 266. The number of plies and fiber orientations may be selected as desired, depending upon the intended application for the resulting part.

After the torsional wrapping step illustrated in FIG. 10, the individual crank arms are once again prepared for curing and then again cured in an autoclave assembly as previously described. After the final curing step, the individual crank arm components are removed from the bagging materials and thereafter the sawed hexagonal aluminum bar stock sections 10 and 12 are threaded or otherwise machined in a conventional manner for attachment to a pedal shaft P and a spider assembly S of a conventional bicycle chain ring. In this context, the spider assembly S provides a plurality of radially extending spokes A with circular apertures H for securement by conventional threaded fasteners in a conventional manner to a bicycle chain ring.

An alternate form of wrapping procedure is illustrated in FIGS. 14 to 16 for use in wrapping the subassembly of FIG. 2 and in place of the overwrap layers 40 and 50 as described. In the alternate form, each ply is applied in a continuous manner, as illustrated in FIG. 16, so that each ply has one free end 140' starting at the bottom edge of the mandrel 10, extending over the top edge of the mandrel 10 and downwardly along the inclined surface of mandrel 14, continuing upwardly along the inclined surface of the mandrel 20 over the outside of the mandrel 12 and continuing along the bottom surfaces of the mandrels 14 and 20 and around the outside of the mandrel 10. This procedure is repeated for the seven plies, after which the mandrels 16 and 18 are nested into position and the plies comprising the layer 140 then wrapped around the upper surfaces of the mandrels 16 and 18 as well as around the outside of the smaller mandrel 12 to terminate at end 140".

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making an integrally stiffened article, comprising the steps of:

providing at least two elongated mandrels;

individually wrapping each of said at least two mandrels with a first layer of a reinforced polymer composite material extending at least once around each of said at least two mandrels;

disposing said at least two mandrels in a predetermined adjacent orientation;

overwrapping a second layer of a reinforced polymer composite material at least once around said at least two mandrels to form a subassembly;

providing at least one additional elongated mandrel;

individually wrapping said at least one additional mandrel with a first layer of a reinforced polymer composite material extending at least once around said at least one additional mandrel;

disposing said at least one additional mandrel in adjacent relation with said subassembly;

overwrapping a third layer of reinforced polymer composite material around said subassembly and said at least one additional mandrel to form an assembly; and curing said assembly to form an article having a plurality of internal integral stiffeners having common fiber reinforcement, with each of said internal integral stiffeners having fiber reinforcement common to said third layer of reinforced polymer composite material.

2. The method of claim 1, wherein said first layer comprises a plurality of plies of reinforced polymer composite material.

3. The method of claim 1, wherein said second layer comprises a plurality of plies of reinforced polymer composite material.

4. The method of claim 1, wherein said third layer comprises a plurality of plies of reinforced polymer composite material.

5. The method of claim 1, wherein each of said first, second, and third layers comprise a plurality of plies of reinforced polymer composite material.

6. The method of claim 1, wherein said first layer comprises a plurality of plies of reinforced polymer composite material having various different predetermined fiber orientations with respect to a longitudinal axis of said article.

7. The method of claim 1, wherein said second layer comprises a plurality of plies of reinforced polymer composite material having various different predetermined fiber orientations with respect to a longitudinal axis of said article.

8. The method of claim 1, wherein said third layer comprises a plurality of plies of reinforced polymer composite material having various different predetermined fiber orientations with respect to a longitudinal axis of said article.

9. The method of claim 1, wherein said each of said first, second, and third layers comprises a plurality of plies of reinforced polymer composite material having various different predetermined fiber orientations with respect to a longitudinal axis of said article.

10. The method of claim 1, wherein said first layer comprises seven plies of reinforced polymer composite material having respective predetermined fiber orientations with respect to a longitudinal axis of said article of 0 degrees.

11. The method of claim 1, wherein said second layer comprises seven plies of reinforced polymer composite material having respective predetermined fiber orientations with respect to a longitudinal axis of said article of 0 degrees.

12. The method of claim 1, further comprising the step of removing at least one of said mandrels from said assembly after curing.

13. The method of claim 12, further comprising the step of slicing said assembly after said step of removing at least one of said mandrels to form a plurality of articles.

14. The method of claim 1, further comprising the step of slicing said assembly after curing to form a plurality of articles.

15. The method of claim 1, wherein at least a portion of at least one of said mandrels forms a permanent part of said article.

16. The method of claim 1, wherein at least one of said mandrels has a triangular transverse cross-sectional shape.

17. The method of claim 1, wherein at least one of said mandrels has a hexagonal transverse cross-sectional shape.

18. The method of claim 1, wherein at least two of said mandrels have different transverse cross-sectional shapes.

19. The method of claim 1, further comprising the step of removing at least one of said mandrels after said step of curing and filling the resulting void with a foam material.

20. The method of claim 1, further comprising the step of applying a torsional overwrap of a reinforced polymer composite material around said article after said step of curing, and recuring said article.

21. The method of claim 1, wherein at least one of said mandrels comprises aluminum.

22. The method of claim 1, wherein each of said internal stiffeners comprise a multi-ply construction.

23. The method of claim 1, further comprising the step of disposing said assembly in a jig fixture prior to said step of curing, said jig fixture having a free floating construction which permits movement of said mandrels together, but restrains movement of said mandrels apart.

24. The method of claim 23, further comprising the step of curing said assembly in a said jig fixture under increased pressure and heat conditions.

25. The method of claim 1, wherein said step of providing at least one additional elongated mandrel comprises providing at least two additional elongated mandrels.

26. A method of making an integrally stiffened article, comprising the steps of:

providing at least two elongated mandrels;

individually wrapping each of said at least two mandrels with a first layer of a reinforced polymer composite material extending at least once around each of said at least two mandrels;

disposing said at least two mandrels in a predetermined orientation;

overwrapping a second layer of a reinforced polymer composite material at least once around said at least two mandrels to form a subassembly including a concave portion;

providing at least one additional elongated mandrel;

individually wrapping said at least one additional mandrel with a first layer of a reinforced polymer composite material extending at least once around said at least one additional mandrel;

disposing said at least one additional mandrel in adjacent abutting relation with said each of said at least two mandrels, said at least one additional mandrel nested within said concave portion of said subassembly;

overwrapping a third layer of reinforced polymer composite material around said subassembly and said at least one additional mandrel to form an assembly; and curing said assembly to form an article having a plurality of internal integral stiffeners having common fiber reinforcement, with each of said internal integral stiffeners having fiber reinforcement common to said third layer of reinforced polymer composite material.

27. The method of claim 26, wherein said each of said first, second, and third layers comprises a plurality of plies of reinforced polymer composite material having various different predetermined fiber orientations with respect to a longitudinal axis of said article.

28. The method of claim 26, further comprising the step of applying a torsional overwrap of a reinforced polymer composite material around said article after said step of curing, and recuring said article.

29. The method of claim 26, further comprising the step of removing at least one of said mandrels after said step of curing and filling the resulting void with a foam material.

30. The method of claim 26, further comprising the step of disposing said assembly in a jig fixture prior to said step of curing, said jig fixture having a free floating construction which permits movement of said mandrels together, but restrains movement of said mandrels apart.

* * * * *